J. A. B. SMITH.
TYPE WRITING MACHINE.
APPLICATION FILED APR. 6, 1916.

1,260,725.

Patented Mar. 26, 1918.
2 SHEETS—SHEET 1.

WITNESSES:
Arthur A. Johnson
F. E. Alexander

INVENTOR:
Jesse A. B. Smith
BY B. C. Stickney
ATTORNEY.

J. A. B. SMITH.
TYPE WRITING MACHINE.
APPLICATION FILED APR. 6, 1916.
1,260,725.
Patented Mar. 26, 1918.
2 SHEETS—SHEET 2.
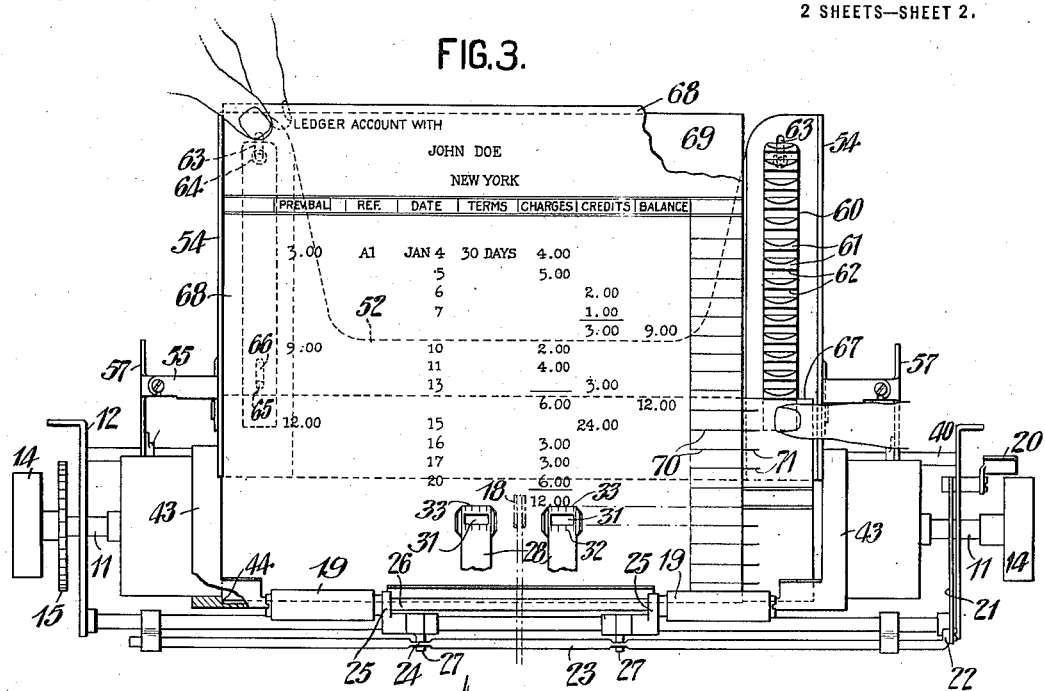
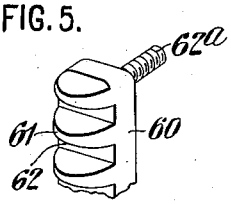
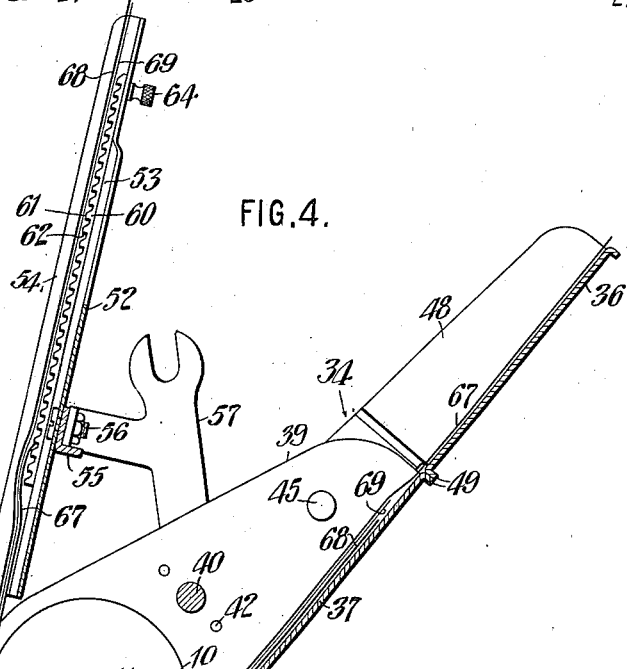
WITNESSES:
INVENTOR:
Jesse A B Smith
BY B L Stickney
ATTORNEY.

UNITED STATES PATENT OFFICE.

JESSE A. B. SMITH, OF GLENBROOK, CONNECTICUT, ASSIGNOR TO UNDERWOOD TYPE-WRITER COMPANY, OF NEW YORK, N. Y., A CORPORATION OF DELAWARE.

TYPE-WRITING MACHINE.

1,260,725.   Specification of Letters Patent.   Patented Mar. 26, 1918.

Application filed April 6, 1916. Serial No. 89,303.

*To all whom it may concern:*

Be it known that I, JESSE A. B. SMITH, a citizen of the United States, residing in Glenbrook, in the county of Fairfield and State of Connecticut, have invented certain new and useful Improvements in Type-Writing Machines, of which the following is a specification.

This invention relates to means to enable work-pieces to be quickly and accurately arranged and gaged on a typewriting machine, and is more particularly designed for the adjustment of work in which a number of work-pieces, which may be of different dimensions and which may be adjusted with their leading edges in different positions of advancement, are arranged to overlie one another at the printing line.

For example, in some systems of book-keeping, it is customary to place a statement-sheet, or the like, on the machine with a loose-leaf-ledger sheet, said sheets overlying one another at the printing line, so that the typewritten entries on the statement-sheet are also recorded on the ledger-sheet. Each statement may comprise a number of entries, bearing different dates, all of which entries are recorded on the ledger-sheet, the latter also sometimes comprising the entries for a number of statements, which, for example, may be monthly statements of a certain account.

As a separate adjustment of the work-sheets on the machine is required for each entry, and as the sheets must be relatively adjusted, to bring them into accurate register, it is highly desirable that means be provided for quickly and accurately adjusting and gaging each sheet on the machine. An object of the present invention is to provide such means.

The invention, as shown, is applied to a machine of the type disclosed in the co-pending application No. 72,013, and is an improvement on the invention shown in said application. In the latter, there is shown a paper chute or guide at the introductory side of the rotary platen, on which the work-sheets may be placed and advanced around the lower surface of the platen and upward past the printing line, to bring their leading ends onto a sheet-collating board or table extending upwardly and rearwardly from the front face of the platen. Said chute and collating board are provided with gages for the side edges of the work-sheets, to enable the latter to be readily squared to the printing line, and adjusted to the desired position lengthwise of the platen.

In arranging the sheets on the platen, an inner work-sheet or unit, which is to receive the carbon impression, is dropped into the chute, at the intake side of the platen, and pushed forwardly into a position to receive the first line of writing. This sheet or unit, when so adjusted, may be held by the operator with one finger, while the outer sheet, which is to receive the original typewritten entry, is dropped into the chute behind the first sheet and pushed forward to bring its leading edge up over the supporting table in front of the platen, where it is adjusted or brought into register with the underlying sheet.

A feature of the present invention relates to gaging means at said collating table for the leading edge of a sheet placed on the platen, whereby the sheet may be quickly and accurately gaged at any one of a series of positions of advancement, said positions being preferably at line-space intervals. For this purpose, a series of gages, which may be in the form of a gage-rack, having teeth or gaging abutments at line-space intervals, are provided on the sheet-collating table, preferably adjacent the outer side edge of the table. The work-sheet, when placed on the machine and advanced to bring its leading end over the collating table, may be quickly adjusted with its end edge to the particular rack tooth or gage required to position the sheet for the first typewritten entry. The gage-rack is preferably adjustable toward and from the printing line on the platen, so that it may be quickly adjusted to any ledger-sheet, ruled statement-sheet, or other work form, so that when the sheet is adjusted to the gage, the printing line on the platen will register with a horizontal ruling or printed form on the work-sheet.

A further feature of the present invention relates to line-gaging means adapted for use either in conjunction with or independently of the gage-rack. Such means may comprise a line-indicating gage, positioned in advance of the printing line, preferably at a line-space distance above the base of the printing line on the platen. By adjusting a ledger-sheet, statement, or the like, with the last typewritten line or entry thereon in register with said line-gage, the sheet is positioned to receive the succeeding typewritten entry without further line-spacing or adjustment in line-spacing direction. Said line-gage and the gage-rack for the leading edge of the work-piece may be relatively adjusted for use with any printed form, as, for example, an invoice sheet having horizontal rulings; that is to say, said rack is so adjusted that when the invoice sheet is adjusted to said line-gage, the rack presents a gaging tooth or abutment at the proper position to engage the edge of the sheet. If the invention is used, for example, in making typewritten entries upon statement-sheets and ledger-sheets, where the ledger-sheet is placed outside of the statement, the latter may be placed on the machine and advanced over the platen until the last typewritten line thereon is at the line-gage, a line-space distance above the printing line on the platen. The operator may then hold the sheet in position by placing a finger on the sheet over said rack-gage, thereby holding the sheet in position with its edge abutting the gage or stop surface. The ledger-sheet may then be placed on the machine outside of the statement-sheet, the operator with the other hand adjusting the ledger-sheet, so that the last typewritten line thereon is at said line-gage. The sheets are thus brought in register and positioned on the platen to receive the typewritten entry, and may be held in such position by the usual platen feed rolls, which, during the adjustment of the sheets, are held off the platen.

A further feature of the invention consists in so arranging the paper-chute at the introductory side of the platen, that it, or the upper section thereof, may be swung forward when not in use, to provide easy access to the mechanism behind or beneath said chute.

Other objects and advantages will appear hereinafter.

In the accompanying drawings,

Fig. 3 is a front elevation, showing the method of adjusting the work on the machine, the platen feed rolls being cast off to permit such adjustment.

Fig. 4 is a sectional end elevation view, showing the work in adjusted position.

Fig. 5 is a fragmentary view of the gage-rack.

Figure 1:
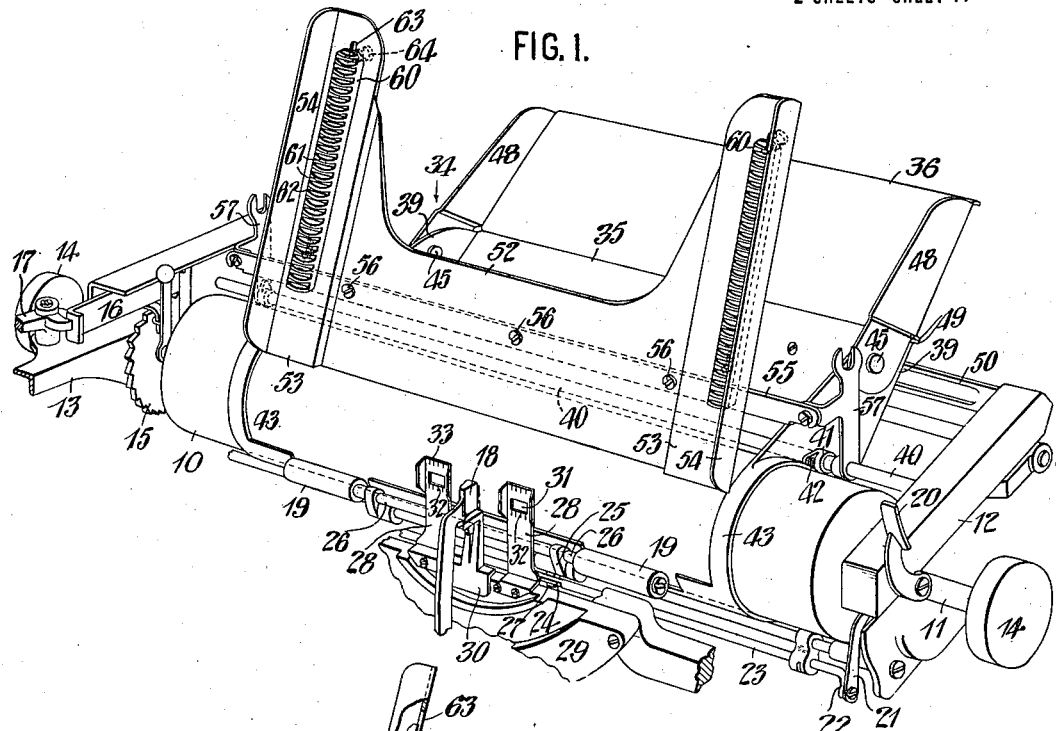
Figure 1 is a front perspective view of the paper-carriage and other parts of an Underwood typewriting machine, with the present invention applied thereto.

The roller platen 10 has its axle 11 journaled in the platen frame 12, mounted for case-shifting movement on the carriage frame 13. The platen may be rotated by hand wheels 14 on the platen axle, or by means of the usual line-spacing mechanism, comprising a line-space wheel 15, fixed to the platen axle and driven step by step by means of a dog on a reciprocating bar 16, actuated by a line-spacing lever 17. Types 18, which may be operated by the usual mechanism (not shown), are adapted to strike against the front face of the platen for printing on the work-sheets.

Platen feed rolls 19 normally bear against the platen and coöperate therewith, to advance the work-sheets when the platen is rotated. The feed rolls may be thrown off the platen by means of a key 20, connected through a link 21 to a rock-arm 22 on the rock-shaft 23. The latter is provided with flats 24, which, when the key 20 is depressed, are rotated from the Fig. 2 position to the Fig. 3 position. Levers 25 carry the shaft 26, on which the feed rolls are mounted, said levers having arms 27, which, when the shaft 23 is rocked, are cammed rearwardly by the flats 24 to move the feed rolls off the platen.

Line-gages 28 may be mounted on the machine frame or type-bar segment 29, said gages, as shown, being located at opposite sides of the type guide 30. Each of said gages is provided with an opening 31, the lower edge of which preferably extends along the base of the printing line on the platen, said edge being provided with scale markings 32, at letter-space intervals, which permit the sheet to be adjusted lengthwise of the platen, to accurately space the printing point with respect to the written characters on the line. The upper edge 33 of each gage bar is preferably a line-space distance above or in advance of the base of the printing line, such distance being measured on the platen by the angular distance between the adjacent teeth of the line-space wheel. It will thus be seen that if a work-sheet is adjusted to bring the last typewritten line to the gage-line 33, as shown in Fig. 3, the work-sheet is in such position that the typewritten entry may be made a line-space distance below the last written line without further adjustment of the sheet in line-spacing direction.

The gage-plates 28 may also serve as card-holders, and, for this purpose may be similar in construction to the card-holding guide-plates shown in the patent to Hellstrom, No. 970,708. In the present invention, the gage-plates 28 are adapted to coöperate with the gaging means for the leading edge of the work-sheets, as hereinafter more fully described, and are also particularly adapted to assist in collating and bringing in register a number of overlying sheets, separately adjusted, as hereinafter explained.

The means for positioning the work-sheets on the platen will now be described. Such means comprises a paper-chute or guide 34 at the introductory side of the platen. Said chute may comprise a lower stationary section 35 and an upper hinged section 36. The section 35 comprises a body portion 37, extending upwardly and rearwardly from the platen and providing a flat surface on which the sheets are placed. The part 37 has a curved extension 38 concentric with the platen and spaced therefrom, to provide a passage for the work-sheets as they are advanced around the platen, said extension terminating a short distance below the writing line on the platen. The ends 39 of the section 35 form gages for the side edges of the work-sheets.

The paper-chute 34 is mounted on the platen frame 12, being supported by a tie rod 40 of said frame, which rod extends through openings in the frame ends 39. The chute may have a fixed connection with said tie rod by means of collars 41, fixed to the rod and connected by screws 42 to the ends 39. The chute is further supported by a supporting plate 50, located beneath the chute and extending between the ends of the platen frame, said plate forming a part of the platen frame. The chute may be connected to said plate by screws 51. The lower portions of the ends 39 may be in the form of rings 43, which surround the platen. Said rings 43 may form continuations of the gaging surfaces 39, as they are provided with shoulders or gaging surfaces 44 (Fig. 3), for the edges of the work-sheets as they are advanced around the platen.

Figure 2:
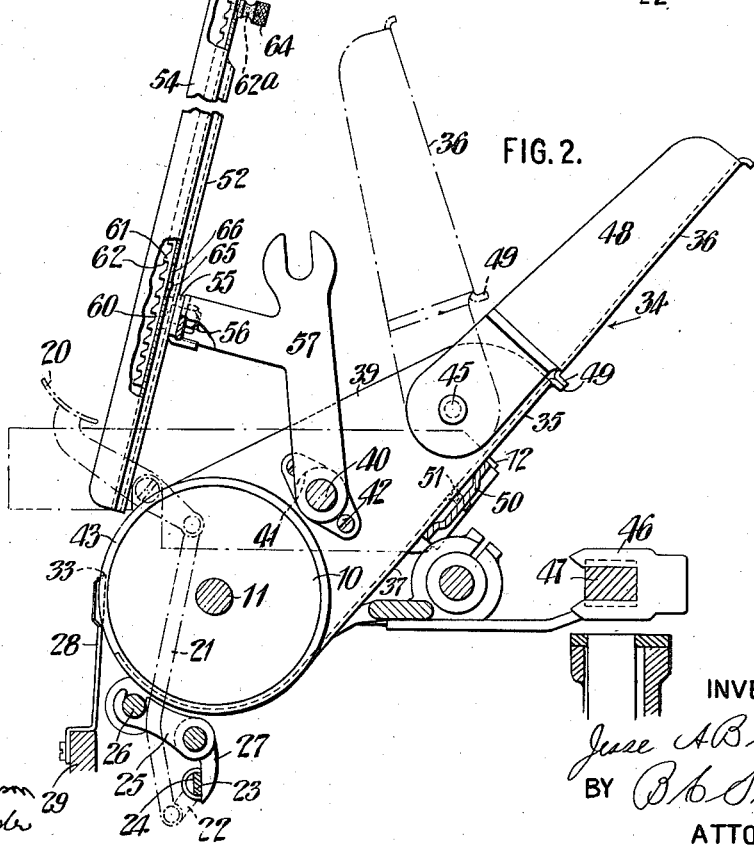
Fig. 2 is a part sectional end elevation of the same.

The upper section 36 of the chute is hinged by means of pivot pins 45 to the stationary section 35, thereby permitting the upper section to be swung forwardly, as indicated in broken lines in Fig. 2, to permit ready access to the parts of the machine which may be located behind or below the paper-chute. Thus, for example, when the chute is swung forward, it is out of the way, so that it does not interfere with the adjustment of the tabulator-stops 46 on the rack-bar 47, mounted on the paper carriage. The swinging section 36 of the paper-chute also comprises flanges 48, forming gages for the work-sheets, said flanges 48 being in alinement with the frame ends 39. The adjacent edges of the two sections of the chute may be offset or bent rearwardly in the form of flanges 49, which provide abutting stops to limit the rearward swinging movement of the section 36 to a position of alinement with the stationary section 35.

A sheet-collating table 52 extends upwardly and rearwardly from the front face of the platen, to provide a support for the leading ends of the work-sheets, on which they are arranged prior to the printing operation. Said table may comprise supporting surfaces 53 for the side margins of the work-sheets, and flanges 54 providing gages for the side edges of the sheets, said gages preferably being in alinement with the gages 39 and 48 of the paper-chute. The supporting surfaces 53 and gages 54 may extend upwardly and rearwardly a substantial distance beyond the central or body portion of the table, to provide ample surface for supporting and gaging the sheets, without obstructing the view of the chute at the rear of the platen or interfering with the manipulation of the work-sheets thereon.

The table 52 is mounted on the platen frame by means of an angle bar 55, extending lengthwise of the platen and connected to said table as by means of screws 56. The bar 55 is connected by screws with brackets 57, mounted on the tie rod 40 of the platen frame. Said brackets 57 may also serve as a means for mounting tally-strip mechanism (not shown), which may be similar to that disclosed in the application above referred to.

The present invention provides means for gaging the leading edge of a work-sheet to any one of a graduated series of positions, at different distances of advancement, said positions being preferably at line-space intervals, determined by the spacing of the teeth on the line-space ratchet wheel 15. Said gaging means, as shown, is in the form of gage-racks 60, which may be mounted on the work-table 52, preferably adjacent the outer edges thereof. Each rack-bar 60 is formed with a series of teeth 61, which provide gaging surfaces or abutments 62, substantially perpendicular to the plane of the work-table, said surfaces being arranged at line-space intervals. Each gage-bar 60 may be adjustably mounted on the work-table by means of a threaded clamping bolt 62$^a$, secured to or formed integral with the bar, and extending through an elongated opening or slot 63 in the table, to receive a clamping nut 64 at the under surface of the table, said nut having a knurled head. The bar 60 may also be provided with a guide-pin 65, working in a slot 66 in the work-table. By loosening the nut 64, the gage may be adjusted toward and from the platen, and then clamped in adjusted position by setting up the nut.

The method of adjusting work-sheets on the platen for one kind of work will now be described. In some systems of bookkeeping, it is customary to place a statement-sheet on the machine together with a loose-leaf ledger sheet, so that the typewritten entries on the statement are also recorded on the ledger sheet. The statement-sheet may comprise a number of entries, bearing different dates, so that the same statement and ledger sheets are placed on the machine a number of times, corresponding to the number of said entries. Also the account recorded on one ledger sheet may comprise the entries from a number of statements. It follows that it may be necessary to place the same ledger sheet on the machine many times, and each time arrange it with reference to the statement sheet, which may either overlie the ledger sheet or be placed beneath it to receive a carbon copy, depending on the system employed.

As herein shown, a statement sheet 67 is first adjusted on the machine and an overlying ledger sheet 68 is then placed in position to overlie the sheet 67, the usual carbon sheet 69 being interposed, and preferably adjusted with the ledger sheet. To position the statement on the platen, it is first placed on the chute 34 and pushed forwardly around the platen to bring the leading edge onto the table 52, where it may be adjusted by the operator placing his finger on the margin of the sheet, preferably the right-hand margin, as shown in Fig. 3, and moving the sheet backward or forward until the last typewritten line thereon is in register with the line-gage 33, the sheet during such adjustment being held with its left-hand edge against the corresponding gage 54. During such adjustment of the sheet, the platen-feed rolls 19 are held off the platen, by the key 20 having been depressed. It will be seen that the sheet is now in such position that when the feed rolls are returned to the platen, the sheet is in position for receiving the typewritten entry, at a line-space distance below the preceding entry, without further rotative adjustment of the platen.

While the statement sheet is held in such adjusted position, the ledger sheet is introduced, being placed on the chute 34 behind the statement sheet and pushed forward until its leading edge may be grasped above the printing line by the other hand of the operator and adjusted to a position, indicated in Fig. 3, wherein the last typewritten line on the sheet is at the line-gage 33, this sheet also being held to the left-hand gage 54. The work-sheets are now in register, and, by returning the feed roll release key 20, are clamped to the platen in such adjusted position, ready for the typewriting operation.

The ledger sheet 68 may be provided with rulings or scores 70, which, when the sheets are in register, are alined with similar scores 71 on the underlying statement sheet. The gage-rack 60 is preferably adjusted as hereinbefore described to correspond with the rulings of the work-sheets, the adjustment being such that when the statement sheet is adjusted to the line-gage 33 and then moved up, if any such movement is necessary, to bring the leading edge against the nearest gaging surface 62 of the rack, the statement sheet is thereby so positioned that the scores 71 thereon will register exactly with the scores 70 on the ledger sheet, when the latter has been adjusted to said gage 33. Although in the example illustrated, the ledger sheet overlies the statement, this arrangement may be reversed and in practice frequently is reversed.

Variations may be resorted to within the scope of the invention, and portions of the improvements may be used without others.

Having thus described my invention, I claim:

1. In a typewriting machine, the combination with a roller platen, of a collating board located at the delivery side of the platen beyond the printing line in position to underlie the leading end of a work-sheet on the platen, said collating board comprising a series of gaging abutments arranged at graduated distances beyond the printing line to permit the leading edge of the sheet to be gaged to any one of said abutments to correspondingly position the sheet on the platen, and means to adjust said collating board with said abutments toward and from the platen.

2. In a typewriting machine, the combination with a roller platen, of a gage rack located at the delivery side of the platen, means to guide a work-sheet over the platen while the latter is at rest, into position for the leading edge of the sheet to overlie said rack, said rack providing a series of gaging abutments against any one of which the edge of the work-sheet may be brought and held while a second sheet is adjusted over the first-named sheet, and means to clamp the sheets to the platen in their adjusted position, and feed them over the platen.

3. In a front-strike typewriting machine, the combination with a roller platen, of a sheet-collating board extending upwardly and rearwardly from the platen at the delivery side thereof, a gage rack at said board over which the work-sheet may slide as it is advanced beyond the printing line, said rack comprising teeth at graduated distances from the printing line, to form abutments against which the leading edge of the sheet may be gaged, and means for adjusting said rack toward and from the printing line.

4. In a typewriting machine, the combination with a rotary platen and line-spacing mechanism to rotate the platen step by step through equal line-space distances, of a collating board at the delivery side of the platen, and a sheet-gaging rack having gaging teeth at line-space intervals, said rack extending in the direction of the travel of the sheets in position to engage the leading edges of the sheets, and said teeth coöperative to variably and concomitantly gage superposed sheets adjusted separately thereto.

5. The combination with a platen, of a pair of leading edge gages having abutments at line-space intervals arranged to engage the top edges of work-sheets to justify the individual sheets with respect to the printing line of the platen, said gages being spaced apart to enable relatively narrow work-sheets to engage the abutments alternately on opposite sides, to bring the lines on superposed work-sheets into predetermined register with each other.

6. The combination with a platen, of a pair of leading edge gages having abutments at line-space intervals arranged to engage the top edges of work-sheets to justify the individual sheets with respect to the printing line of the platen, said gages being spaced apart to enable relatively narrow work-sheets to engage the abutments alternately on opposite sides, to bring the lines on superposed work-sheets into predetermined register with each other, and individual adjusting means for each gage, enabling them to be adjusted relatively to each other and to the printing line on the platen.

7. The combination with a platen, of a collating table extending up from said platen at the discharge side thereof, said collating table including a pair of side gages spaced apart a greater distance than the normal width of the work-sheets, so as to collate and gage relatively to one another a plurality of work-sheets, some of which do not reach to one side gage, by engaging alternate side edges of the work-sheets with said gages, and a pair of leading edge multiple gages in juxtaposition to the side gages, arranged to engage individually with the leading edges of the alternate work-sheets at any one of a plurality of positions at line-space intervals, so as to bring into register with each other selected line-spaces of the superposed work-sheets.

8. The combination with a platen, of a pair of spaced forwardly projecting side gages extending upwardly from the front side of the platen in a position to receive work-sheets from the platen, to permit gaging of the work-sheets by the projecting side edges engaging the side gages while the intermediate portions overlap, to permit the same subject-matter to be written on all work-sheets, and a plurality of series of gaging abutments, the abutments in each series being arranged at line-space intervals, positioned to engage, as to each individual series, with different ones of said work-sheets, so as to enable said work-sheets to overlap, as to their length, different amounts, thus enabling the bringing into register of any selected line-spaces at different positions on the several sheets.

9. The combination with a platen, of gaging means for collating a plurality of work-sheets to variably overlap lengthwise selectively, so as to bring into register any selected groupings of line-spaces on superposed work-sheets which overlap variably transversely, to bring into register different portions of the overlapping work-sheets, said gaging means comprising spaced projecting flanges to engage the side edges of work-sheets, and abutting gages to engage the top edges of the work-sheets, said abutting gages spaced from each other to clear the side overlapping portions of superposed work-sheets.

10. The combination with a platen and a collating board arranged at the delivery side thereof and having opposite side edge gages, of a series of line-space gaging abutments projecting from said board near said gages, to permit narrow sheets to be gaged sidewise by either side gage and also to be gaged endwise by either set of line-space gages, leaving the other set of line-space gages exposed for use in gaging a superposed sheet thereto.

11. The combination with a platen and a collating board arranged at the delivery side thereof and having opposite side edge gages, of a series of line-space gaging abutments projecting from said board near said gages, to permit narrow sheets to be gaged sidewise by either side gage and also to be gaged endwise by either set of line-space gages, leaving the other set of line-space gages exposed for use in gaging a superposed sheet thereto, said line-space gages being mounted upon the end portions of said collating board which are raised above the middle portion thereof.

12. In a typewriting machine, the combination with a platen, of means for supporting superposed work-sheets thereon, and a graduated series of coöperative stationary gaging abutments at the delivery side of the platen, for gaging said sheets concomitantly by their leading portions to different predetermined positions preparatory to writing thereon.

13. In a typewriting machine, the combination with a platen, of means for supporting superposed work-sheets thereon, a graduated series of coöperative stationary gaging abutments at the delivery side of the platen, for gaging said sheets concomitantly by their leading portions to different predetermined positions preparatory to writing thereon, and a side edge gage for the superposed sheets adjacent to said leading-edge gages.

14. In a typewriting machine, the combination with a platen, of means for collating or separately and variably adjusting and gaging superposed work-sheets on the platen, comprising a collating board at the delivery side of the platen, over which the work-sheets may extend during such adjustment, said board provided with a series of coöperative leading-edge gaging abutments with any one of which the leading edge of a sheet may be brought into engagement, said abutments arranged to permit the outer sheets upon the platen to be gaged with their leading edges at greater distances from the platen than the inner sheets, a side gage for the sheets, and means for clamping the sheets to the platen in their gaged positions.

JESSE A. B. SMITH.

Witnesses:
ARTHUR A. JOHNSON,
JOHN F. RULE.